United States Patent
Grebnev et al.

(10) Patent No.: US 6,230,734 B1
(45) Date of Patent: May 15, 2001

(54) FLOW-RATE CONTROLLER

(75) Inventors: Mikhail Jurievich Grebnev, Moscow;
Boris Mikhailovich Gromyko, Khimki;
Viktor Antonovich Kartysh, Khimki;
Igor Ivanovich Khrenov, Khimki, all of (RU)

(73) Assignee: Otkrytoe Aktsioneirnoe Obschestvo "Nauchnoproizvodstvennoeobiendinene "Energomash" Imeni Akademika V.P.Glushko" (RU)

( * ) Notice: Subject to any disclaimer, the term of this patent is extended or adjusted under 35 U.S.C. 154(b) by 0 days.

(21) Appl. No.: 09/405,696

(22) Filed: Sep. 24, 1999

(30) Foreign Application Priority Data

Feb. 23, 1999 (RU) ................................................ 99103535

(51) Int. Cl.[7] ................................ F16K 1/12; G05D 7/01
(52) U.S. Cl. ............................................ 137/220; 137/501
(58) Field of Search ...................................... 137/220, 501

(56) References Cited

U.S. PATENT DOCUMENTS 3,130,747  4/1964  Benaway .

OTHER PUBLICATIONS

Cosmonautics Encyclopedia; Moscow; 1985, p. 16.

*Primary Examiner*—Gerald A. Michalsky
(74) *Attorney, Agent, or Firm*—Blakely Sokoloff Taylor & Zafman

(57) ABSTRACT

A flow-rate controller comprises hollow casing 1, main 2 and additional 3 outlet branch pipes, and outlet branch pipe 4. Piston-type slide valve 13 with skirt 14 is located between front 5 and rear 10 guide bushes. The starting fuel component flows through the controller via branch pipe 3, hole 22, inlet space 7, holes 24 and 23, passage space 8, outlet orifices 11 and outlet branch pipe 4. It is followed by the main fuel component supplied to the system through the controller via branch pipe 2, open nonreturn pressure control valve 27, open front orifices 9, passage space 8, outlet orifices 11 and outlet branch pipe 4. Constant rates of flow of both the starting and the main fuel components through the controller are assured by the aforesaid original design slide valve and by the corresponding channels.

3 Claims, 1 Drawing Sheet

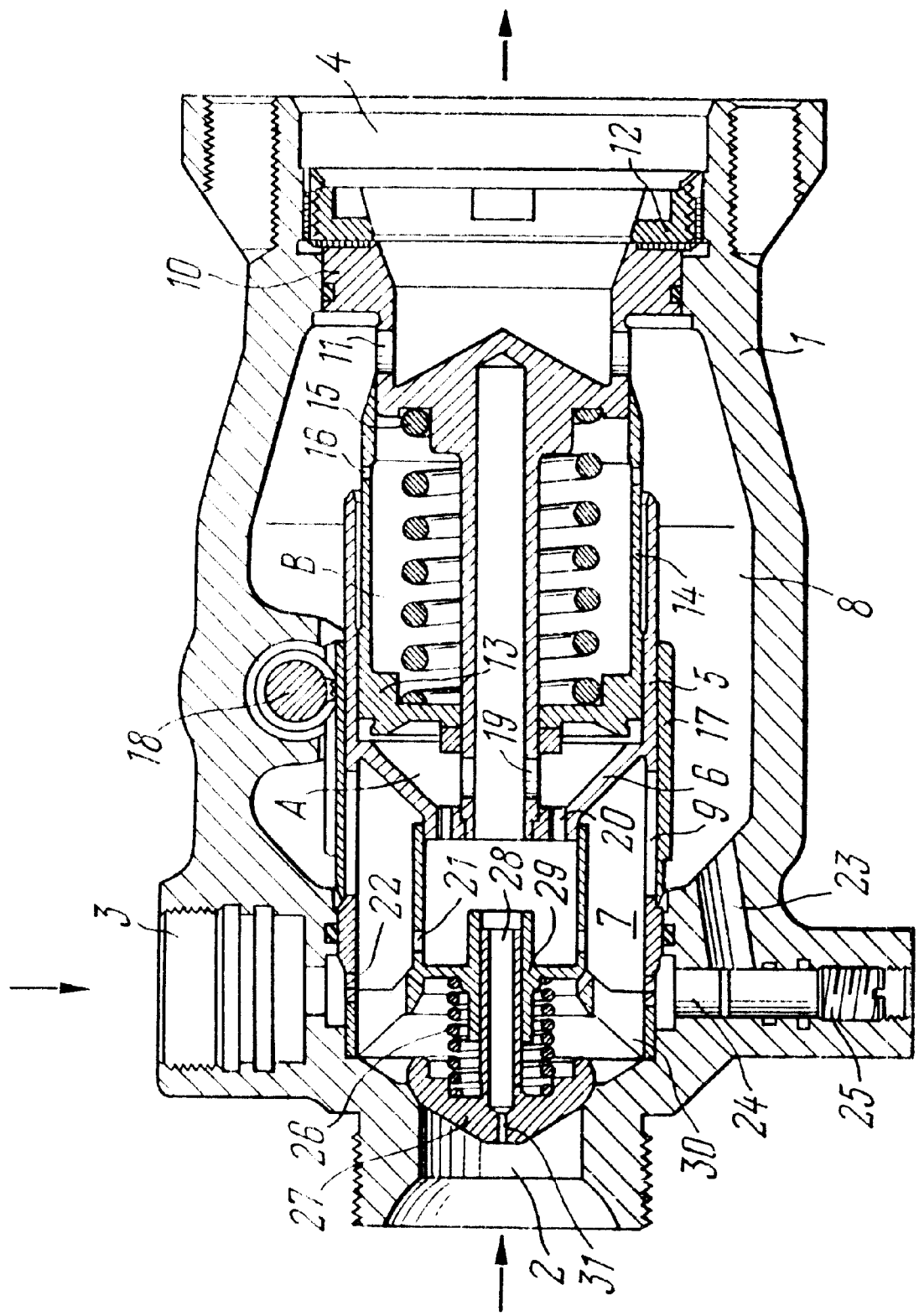

FLOW-RATE CONTROLLER

FIELD OF THE INVENTION

The present invention relates to automatic equipment and, more specifically, to flow-rate controllers mounted in hydraulic systems of power plants, for instance, in regulator systems of liquid-propellant rocket engines.

BACKGROUND OF THE INVENTION

Known in the art is a flow-rate controller (U.S. Pat. No. 3,130,747, Cl. 137–504, 1964) comprising a spring-loaded slide valve communicating with the inlet space of the unit from one side, and with the internal space of the controller through openings in the slide valve from the other side. This controller assumed to be similar to the present invention is deficient in that it is designed for operation under constant flow rate conditions and cannot assure the manifold operation in different modes.

Prior art also includes a liquid flow-rate controller which is made in the form of a casing with the main inlet and outlet branch pipes and comprises: a stationary front guide bush with front orifices and with a lateral partition limiting the internal space of said bush to form an inlet space communicating directly with the main branch pipe; a sleeve arranged coaxially in said front guide bush and caused by a mechanically connected actuator to slide therein with a possibility of covering the front orifices; a stationary rear guide bush located in line with the front guide bush and having outlet orifices in its walls; a piston-type slide valve with skirt arranged between said lateral partition and said rear guide bush to form a piston space limited by said lateral partition, the piston being spring-loaded on the side of the rear guide bush and capable of making contact with said lateral partition; a passage space formed between the casing and said front and rear guide bushes whereby the inlet space communicates with the outlet branch pipe via the front and outlet orifices. The holes provided in the aforesaid piston skirt enable the skirt cavity to communicate with the passage space, and the rear portion of the skirt which is a free fit on the rear guide bush can cover the latter's outlet orifices ("Cosmonautics" Encyclopedia, Sovetskaya encyclopedia, 1985, p. 16, FIG. 9).

The disadvantage of this controller which represents the closest prior art of the claimed invention consists in that the rate of liquid flow through the gaps between the controller parts at further reduction of the minimal flow rate becomes commensurate with the rate of liquid flow through the throttling device, wherefore the accuracy in the setting of the required flow rate diminishes appreciably, particularly at the low power setting, which is of special importance in the engine starting mode.

Besides, the known controller calls for special devices making it possible to change the engine fuel supply from an additional inlet branch pipe (the starting tank) to the main inlet branch pipe (main fuel manifold).

OBJECTS OF THE INVENTION

It is an object of the present invention to eliminate the above-mentioned disadvantages by providing a flow-rate controller capable of starting the engine at a fixed setting of the fuel control device (shaft) and assuring a higher accuracy of the additional supply of working medium to the flow-rate controller.

It is another object of the present invention to improve the accuracy of the flow-rate controller operation at engine low power and permit changing the controller supply from an additional inlet branch pipe to the main inlet branch pipe.

SUMMARY OF THE INVENTION

In accordance with these objects, the present invention resides in that a liquid flow-rate controller which is made in the form of a casing with the main inlet and outlet branch pipes and comprises: a stationary front guide bush with front orifices and a lateral partition limiting the internal space of said bush to form an inlet space communicating directly with the main branch pipe; a sleeve arranged coaxially with said front guide bush and caused by a mechanically connected actuator to slide ever and along it with a possibility of covering the front orifices; a stationary rear guide bush located in line with the front guide bush and having outlet orifices in its walls; a piston-type slide valve with skirt arranged between said lateral partition and said rear guide bush to form a piston space limited by said lateral partition, the piston being spring-loaded on the side of the rear guide bush and capable of making contact with said lateral partition; a passage space formed between the casing and said front and rear guide bushes whereby the inlet space communicates with the outlet branch pipe via the front and outlet orifices, the holes in the aforesaid piston skirt enabling the skirt cavity to communicate with said passage space, and the rear portion of the skirt fitted freely on the rear guide bush having a possibility to cover the latter's outlet orifices, is provided additionally with a nonreturn valve and a throttle adjuster arranged in the channel connecting said inlet space with said passage space, and the controller casing is provided additionally with an inlet branch pipe arranged in the front portion of said casing and connected to the inlet space through the inlet holes in said front guide bush fitted in a controllable sleeve, said nonreturn valve being mounted in said main inlet branch pipe on the side of said inlet space, and said lateral partition being provided with holes to connect said inlet space with said piston space.

The nonreturn valve is a spring-loaded mushroom type with a stem arranged in the guide sleeve. The sleeve is installed on pylons located in the inlet space and secured on the front guide bush, whereas the mushroom-like head of the nonreturn valve is provided with an axial opening to maintain a partial vacuum in engine spaces.

The nature of the invention is further described in detail with reference to the accompanying drawing (FIG. 1) representing a longitudinal section of a flow-rate controller embodiment.

The disclosed flow-rate controller comprises hollow casing 1 with main 2 and additional 3 inlet branch pipes, as well as outlet branch pipe 4. Main branch pipe 2 serves to supply the main fuel component, and additional inlet branch pipe 3, the starting fuel component.

The front portion of casing 1 accommodates rigidly fastened front guide bush 5 made integral with lateral partition 6, the inner cavity of said front guide bush representing inlet space 7. Passage space 8 formed between front bush 5 and the inner surface of casing 1 communicates with inlet space 7 via front orifices 9 made in the walls of bushing 5.

The rear portion of casing 1 accommodates rear guide bush 10 rigidly fastened in line with the front guide bush. Outlet orifices 11 made in the walls of the rear bush connect passage space 8 with outlet branch pipe 4.

The rigid position of front guide bush 5 and rear guide bush 10 in respect of casing 1 is assured by nut 12 tightened to a positive stop.

The space between front guide bush 5 and rear guide bush 10 is occupied by the slide valve made in the form of piston 13 with skirt 14. Piston 13 loaded by spring 15 thrusts against rear guide bush 10 and maintains contact with the inner surface of the rear portion of front guide bush 5. Piston skirt 14 is provided with holes 16 and the rear portion of said skirt is fitted freely on rear guide bush 10 being thus capable of covering the latter's outlet orifices 11.

Sleeve 17 fitted on front guide bush 5 is linked to actuator 18 which causes said sleeve to slide along bush 5 with the possibility of covering front orifices 9 in said bushing. Actuator 18 may be an electric motor (not shown in the Figure), its shaft being connected to sleeve 17 through a rack gearing.

Piston space A formed between partition 6 and piston 13 communicates with additional inlet branch pipe 3 via holes 19, 20, 21 and 22. Space B on the side of the skirt of piston 13 also communicates with inlet branch pipe 3 via holes 16, passage space 8 in casing 1, holes 23 and 24, inlet space 7 and hole 22. The fuel passage between holes 23 and 24 is controlled by a throttle adjuster which is essentially adjusting screw 25.

Main inlet branch pipe 2 carries nonreturn pressure control valve 27 installed on the side of inlet space 7. This valve comprising a mushroom-like head and stem 28 is loaded with spring 26. The stem is arranged in guide sleeve 29 which is installed on pylons 30 located in inlet space 7. Mushroom head 27 is provided with axial opening 31.

The proposed controller operates as follows:

The fuel starting component supplied to inlet branch pipe 3 fills passage space 8 via holes 22, 24 and 23 and flows further to the engine via outlet orifices 11 and outlet branch pipe 4. The flow of the starting fuel component into main inlet branch pipe 2 is prevented by spring-loaded mushroom head 27 held against its seat in controller casing 1, whereas front orifices 9 are covered by sleeve 17 held against the end face of bush 5 by the axial thrust of actuator 18.

The required flow area between holes 23 and 24 is set at the factory by adjusting screw 25. The rate of flow of the fuel starting component is determined by the passage area of the fuel supply channel and the differential pressure across it. Hence, in order to maintain the constancy of the rate of flow of the fuel starting component set by adjusting screw 25 it is necessary to assure a constant difference of pressures at the channel inlet and outlet. To this end, the pressure of the fuel starting component built up in the cavity with hole 24 is also applied to space A (via holes 21, 20 and 19), and the pressure built up in the cavity with hole 23, to space B (via passage space 8 and holes 16 in piston skirt 14). The rated difference of pressures maintained in spaces A and B and, consequently, the constancy of the fuel flow rate is attained owing to a balance of the force of spring 15 and the force applied to slide valve piston 13. In the event of any random deviation of the aforesaid pressure differential the balance of forces is disturbed and piston 13, moving in one or another direction, partially covers or uncovers outlet orifices 11. As a result, the rated pressure differential across slide valve piston 13 and, consequently, the desired rate of flow of the fuel starting component through the regulator is restored back to normal.

In order to change to the fuel main component, actuator 18 moves sleeve 17 which partially uncovers front orifices 9. The fuel main component supplied through inlet branch pipe 2 forces the mushroom head of nonreturn pressure control valve 27 off its seat in casing 1, enters the controller and passes into the engine. Further displacement of sleeve 17 increases the rate of flow of the fuel main component through the controller to the set value.

If the pressure grows, a special device, e.g. a check valve (not shown in the Figure) cuts off the manifold of additional branch pipe 3 and terminates further supply of fuel through it.

As is seen from the above description, uniform operation of the main and starting manifolds provided by the disclosed flow-rate controller is based on one and the same principle.

Axial hole 31 made in mushroom valve 27 serves to assure a complete discharge of the controller inner cavity during the test of system components by the manufacturer.

Industrial Applicability

The flow-rate controller is designed for liquid pipelines, primarily in liquid-fuel rocket engines. It can be also used in different plants and installations employing liquid pipelines.

The invention is claimed as follows:

1. A liquid flow-rate controller made in the form of a casing with the main inlet and outlet branch pipes comprising:

a stationary front guide bush with front orifices and a lateral partition limiting the internal space of said bush to form an inlet space communicating directly with the main branch pipe; a sleeve arranged coaxially with said front guide bush and caused by a mechanically connected actuator to slide ever and along it with a possibility of covering the front orifices; a stationary rear guide bush located in line with the front guide bush and having outlet orifices in its walls; a piston-type slide valve with skirt arranged between said lateral partition and said rear guide bush to form a piston space limited by said lateral partition, the piston being spring-loaded on the side of the rear guide bush and capable of making contact with said lateral partition; a passage space formed between the casing and said front and rear guide bushes whereby the inlet space communicates with the outlet branch pipe via the front and outlet orifices, a plurality of holes in the aforesaid piston skirt enabling a skirt cavity to communicate with said passage space, and the rear portion of the skirt being fitted freely on the rear guide bush with a possibility of covering the latter's outlet orifices; a nonreturn valve and a throttle adjuster arranged in a channel connecting said inlet space with said passage space; and an additional inlet branch pipe arranged in the front portion of said casing and connected to said inlet space through a plurality of inlet holes in said front guide bush fitted in a controllable sleeve, said nonreturn valve being mounted in said main inlet branch pipe on the side of said inlet space, and said lateral partition being provided with holes to connect said inlet space with said piston space.

2. A liquid flow-rate controller as claimed in claim 1, wherein the nonreturn valve is a spring-loaded mushroom type with a stem arranged in the controllable sleeve, said sleeve being installed on pylons located in the inlet space and secured on the front guide bush.

3. A liquid flow-rate controller as claimed in claim 2, wherein the mushroom-like head of said nonreturn valve is provided with an axial opening.

* * * * *

UNITED STATES PATENT AND TRADEMARK OFFICE
CERTIFICATE OF CORRECTION

PATENT NO. : 6,230,734 B1
DATED : May 15, 2001
INVENTOR(S) : Grebnev et al.

It is certified that error appears in the above-identified patent and that said Letters Patent is hereby corrected as shown below:

Title page,
Item [73], Assignee, please delete "Aktsioneirnoe" and insert -- Aktsionernoe --; please delete "Nauchnoproizvodstvennoeobiendinene" and insert -- Nauchno-Proizvodstvennoe Obiedinenie --.

Signed and Sealed this

Twenty-second Day of March, 2005

JON W. DUDAS
*Director of the United States Patent and Trademark Office*